United States Patent
Gerard et al.

[11] Patent Number: 5,421,390
[45] Date of Patent: Jun. 6, 1995

[54] TIRE WITH TWO TREADS AND GROOVE OF ADAPTED SHAPE

[75] Inventors: Francois Gerard, Riom; Patrice Peyraud, Chamalieres, both of France

[73] Assignee: Compagnie Generale des Etablissements Michelin-Michelin & Cie, Clermont-Ferrand Cedex, France

[21] Appl. No.: 201,805

[22] Filed: Feb. 25, 1994

[30] Foreign Application Priority Data

Mar. 1, 1993 [FR] France ............... 93 02538

[51] Int. Cl.⁶ .................. B60C 3/00; B60C 101/00
[52] U.S. Cl. .................. 152/209 R; 152/209 WT; 152/454
[58] Field of Search ............ 152/450, 454, 209 WT, 152/209 R

[56] References Cited

U.S. PATENT DOCUMENTS

| | | | |
|---|---|---|---|
| 2,691,335 | 10/1954 | Murray | 152/454 |
| 2,703,517 | 3/1955 | Hooper | 152/454 |
| 3,830,273 | 8/1974 | Boileau | |

FOREIGN PATENT DOCUMENTS

| | | | |
|---|---|---|---|
| 0465786 | 1/1992 | European Pat. Off. | |
| 0607026 | 6/1926 | France | 152/454 |
| 8600264 | 1/1986 | WIPO | 152/450 |
| WO9014239 | 11/1990 | WIPO | |

*Primary Examiner*—Adrienne Johnstone
*Attorney, Agent, or Firm*—Brumbaugh, Graves, Donohue & Raymond

[57] ABSTRACT

In order to improve the fatigue strength of the bottom (80) of the groove (8) which is located axially between the two treads (1A) (1B) of the of the same tire and which extends radially over a reinforcement wire (7) which is located axially at the level of the equatorial plane (XX') of the tire, and below which the carcass reinforcement (10) passes, said groove (8) has a special meridian configuration in combination with the radial position of the center of gravity of the reinforcement wire (7).

8 Claims, 4 Drawing Sheets

TIRE WITH TWO TREADS AND GROOVE OF ADAPTED SHAPE

BACKGROUND OF THE INVENTION

The present invention relates to a tire having a large area of contact with the ground, which area is subdivided into several areas, and more particularly a tire comprising, between two axially spaced treads, a connection which is reinforced at its center by a wire.

French Patent 2 187 560 describes such a tire which has an independent reinforcement in each tread and a connection having substantially the same structure on both sides of the meridian wire, the same equilibrium profile in the inflated condition of the carcass reinforcement and therefore the same flexibility as the flexible regions of the two sidewalls, that is the regions of the sidewall regions which are adjacent the treads. Each connecting portion and each flexible sidewall region have substantially the same radial height, this height being selected in such a manner that the equilibrium meridian profile of the connecting portion and of the flexible sidewall region is tangent to a plane perpendicular to the axis of the tire at a point close to the radially inner ends of said regions and portions.

While a tire constituted in this manner has excellent adherence at high speed both to dry ground and to wet or very wet ground, the connecting region reinforced at its center by the wire has an obvious lack of fatigue strength.

SUMMARY OF THE INVENTION

The problem which forms the basis for the present invention is to overcome this state of affairs by improving the life of the tire in question while permitting very good hydroplaning behavior.

For this purpose, a tire having at least two treads which are spaced axially from each other by a connecting region comprising a groove and, at its center, a reinforcement wire of a radius less than that of the treads and radially on the inside of which a radial carcass reinforcement passes which is anchored in each bead to at least one bead wire, said reinforcement having mounted radially over it at least one crown reinforcement formed of at least two plies of cords or cables inclined with respect to the circumferential direction by an angle of between 10° and 50°, characterized by the fact that the groove in the connecting region between the two treads has a width, measured at the level of the tread surfaces, of between 0.10 and 0.25 times the total width of the two treads, a depth at least equal to $0.6(R_S-R_E)$ and walls which are inclined with respect to a perpendicular to the travel surface by an angle $\alpha$ of between 15° and 25°, these two walls being connected radially towards the inside by a cylindrical portion tangent to said walls, and by the fact that the radius $R_T$ of the center of gravity of the transverse section of the reinforcement wire is at least equal to $R_E+0.1(R_S-R_E)$, $R_S$ being the radius of the points of the carcass reinforcement furthest from the axis of rotation, $R_E$ being the radius of the points of the carcass reinforcement furthest axially from the equatorial plane of the tire, the radii $R_S$, $R_E$, $R_T$ being measured with respect to the axis of rotation of the tire.

The shape of the cross section of the connecting groove thus described, combined with the radial position of the reinforcement wire, makes it possible to minimize the stresses at the bottom of the groove and accordingly to minimize the initiation of scratches or fissures by relatively cutting objects on the ground on which the tire travels, as well as the initiation of fatigue cracks and to minimize the speed of propagation of the cracks.

The radial position of the reinforcement wire of the connecting region permits a more homogeneous working of said wire upon passage of the contact of ellipse with the ground, and the speed of propagation of the cracks being greatly reduced, the risk of detachments around the wire is effectively reduced.

In order to reduce the speed of propagation of the fissures initiated either by cuts or by fatigue as much as possible, it is advantageous, as is known, for the layer of vulcanized rubber, on the one hand, forming the bottom of the groove and, on the other hand, radially covering the reinforcement wire to have a formulation identical to the vulcanized rubber employed for the outer rubbers of the sidewalls of the tire. This layer of vulcanized rubber will preferably be reinforced by at least one ply of cords or cables, oriented with respect to the circumferential direction at an angle of between 0° and 90°, said ply or plies being arranged radially approximately at the middle of said layer of vulcanized rubber.

The carcass reinforcement of the tire of the invention may have arranged radially above it either a single crown reinforcement, that is to say a reinforcement the plies of which extend axially from the axially outer edge of one of the treads to the axially outer edge of the other tread, or a crown reinforcement one of the plies of which is continuous axially from edge to edge and the other is formed of two distinct parts, namely two distinct crown reinforcements, each of said reinforcements reinforcing a tread.

The ply or plies reinforcing the layer of vulcanized rubber below the groove and over the wire can be the axially continuous ply or plies of the crown reinforcement. In the third case of two separate crown reinforcements, the ply or plies reinforcing the layer of vulcanized rubber will advantageously be formed of cords or cables, preferably textile, oriented at an angle of between 0° and 90° with respect to the circumferential direction, the values 0° and 90° being included within the range. The width or widths of this ply or these plies may be such that their axial edges are not radially juxtaposed with the axially inner edges of the two crown reinforcements. The width or widths of this ply or these plies will, however, advantageously be such that their axial edges are juxtaposed radially with the edges of the crown reinforcements, either that said ply edges are located radially over the edges of the crown reinforcements or that they are located radially below the edges of said reinforcements.

Surprisingly, the initiation by fatigue of fissures or cracks in the bottom of the groove, as well as the propagation of these fissures, can be minimized by the presence between the carcass reinforcement and the reinforcement wire of at least one layer of cords or cables.

The width of this layer will preferably be such that there is continuity of reinforcement between the axially outer edges of the treads. Thus, this layer can be formed by one of the plies of the single crown reinforcement of the tire or by two plies of said reinforcement, but it is preferably formed at least of one ply of textile cords or cables oriented by an angle between 0° and 90° with respect to the circumferential direction, the values 0° and 90° included, and the width of which will be such that its edges are radially juxtaposed with the axially inner edges of the two different reinforcements reinforcing the two treads respectively.

The group of reinforcement layers, on the one hand, above the reinforcement wire and, on the other hand, between the reinforcement wire and the carcass reinforcement, permits a remarkable resistance of the tire with respect to the fatigue strength under study.

DESCRIPTION OF THE DRAWINGS

The characteristics and advantages of the present invention will be better understood by means of the following description with reference to the drawings which show, by way of illustration and not of limitation, embodiments of the invention, and in which.

DESCRIPTION OF PREFERRED EMBODIMENTS

Figure 1:
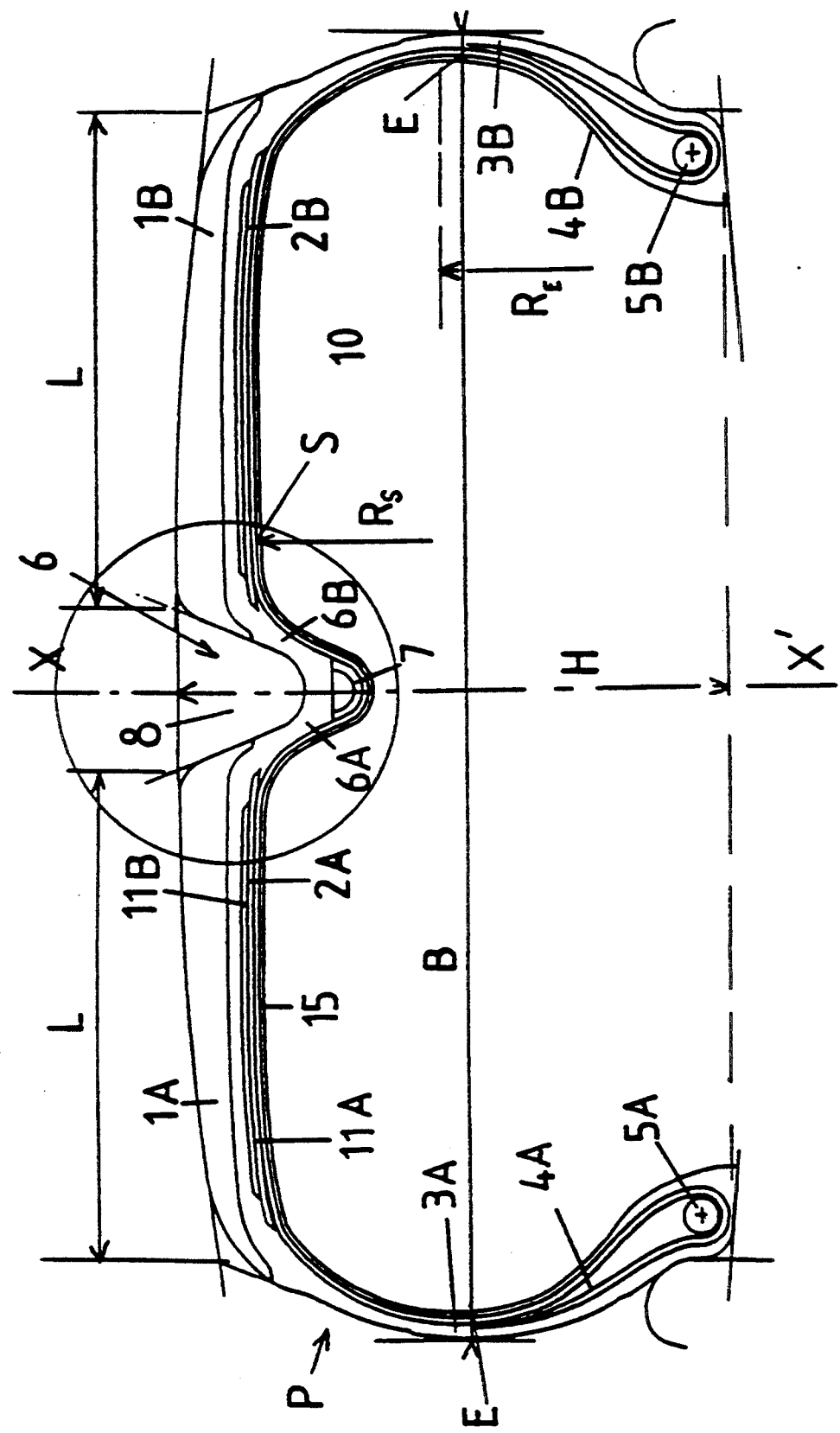
FIG. 1 is a cross section through a 235-45-17X tire in accordance with one variant of the invention.

The tire P shown in FIG. 1, which is of size 235-45-17X, has a nominal form ratio H/B equal to 0.45, H being the height on the rim and B being the maximum axial width. It comprises two identical treads 1A and 1B reinforced by two identical crown reinforcements 2A and 2B, these reinforcements 2A and 2B being each formed of two plies 11A and 11B of metal cables which are parallel to each other in each ply and crossed from one ply to the following one, forming an angle of 25° with the circumferential direction of the tire.

It furthermore comprises two sidewalls 3A and 3B terminating in beads 4A and 4B each containing a bead wire of braided type 5A and 5B. The two treads 1A and 1B are connected by a connecting region 6, formed by two wall portions 6A and 6B surrounding a groove 8 and embodying a wire 7.

The carcass reinforcement 10 is formed of a single ply 10 of radially disposed textile cables which extends, seen in cross section (FIG. 1), from the bead wire 5A in the sidewall 3A, then beneath the tread 1A, then following the portions 6A and 6B, passing radially below the reinforcement wire 7 and extending, over a symmetrical path, to the bead wire 5B of the bead 4B. The points S of this reinforcement 10 which are furthest from the axis of rotation of the tire are at a distance $R_S$ from said axis.

The points E of said reinforcement 10 which are furthest axially from the equatorial plane XX' are spaced from the axis of rotation by an amount $R_E$. In the case studied, $R_S$ and $R_E$ are equal to 306 mm and 272 mm respectively.

Figure 2:
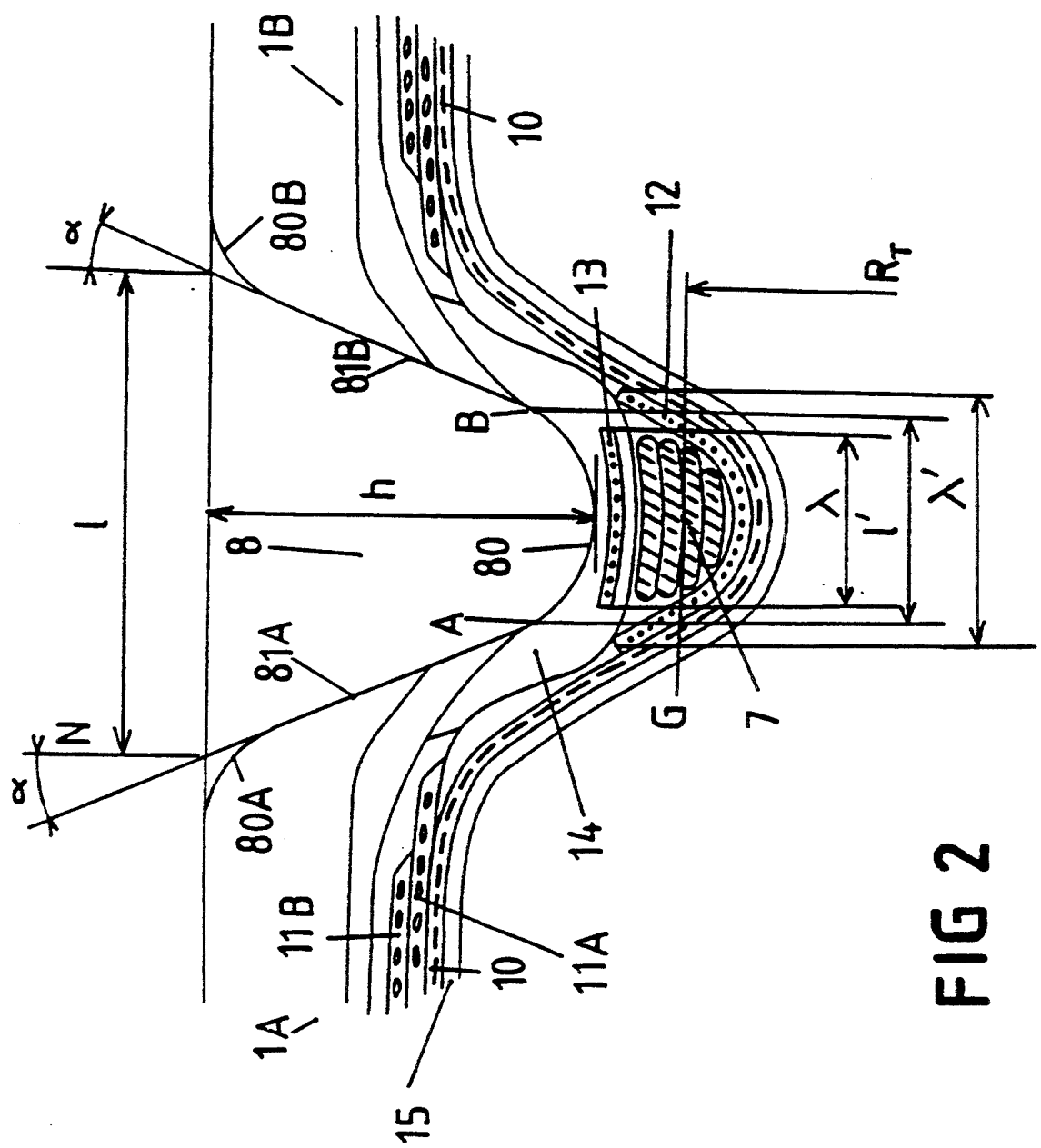
FIG. 2 is an enlarged cross section of the encircled portion of FIG. 1.

In FIG. 2, the groove 8 of the connecting zone 6 has two linear walls 81A and 81B inclined with respect to a normal N to the travel surface by an angle $\alpha$ equal to 23°. These walls 81A and 81B are connected to the surfaces of treads 1A and 1B by circular portions 80A and 80B, while they are connected to each other by a circular portion 80 which is tangent to them at points A and B in order to form the groove bottom. This groove 8 has a depth h equal to 24 mm, namely $0.7(R_S-R_E)$ and greater than $0.6(R_S-R_E)$ by 3.6 mm, $R_S$ and $R_E$ being shown in FIG. 1. The depth h is the distance between the imaginary line connecting the two inner edges of the treads 1A and 1B from the lowest point of the groove bottom 80 which is closest to the axis of rotation of the tire. This groove 8 has an axial width 1 equal to 31 mm, this width being measured between the two points of intersection formed by the groove walls 81A and 81B and the traces of the tread surfaces 1A and 1B. This width 1 is equal to 0.17 times the total width of the two treads 1A and 1B. By total width there is to be understood the sum of the two tread widths L.

As to the reinforcement wire 7 for the connecting region 6, it is a wire of package type obtained by winding a metal wire on a suitable form (the layers alone and not the wires being shown) and furthermore has a cross section, the center of gravity G of which is radially spaced from the axis of rotation by a radius $R_T$ equal to 289 mm, greater than the quantity $R_E+0.1(R_S-R_E)$. It has been found in accordance with the invention that if the distance $R_T$ is selected less than this amount, the stability of the inflated tire may be impaired.

Between the groove bottom 80 and the radially outer face of the wire 7, there is arranged a rubber mix 14 forming, in particular, the groove bottom 80. The mix 14 is of the same quality as the rubber mix covering the sidewalls 3A and 3B. It is reinforced by a ply 13 of textile cables, of a width $\lambda$ equal to 10 mm, this width $\lambda$ being equal to 0.8 times the width 1', the axial distance between the points A and B of tangency of the walls 81A and 81B with the groove bottom 80 and being referred to as the width of the groove bottom 80. The cables of this ply 13 form an angle $\alpha 1$ of 0° with the circumferential direction of the tire.

This ply 13 forms a barrier for the propagation of cracks towards the reinforcement wire 7. The connecting region 6 is supplemented by a reinforcement ply 12 of the carcass reinforcement 10. This reinforcement ply 12, formed of textile cables forming an angle $\alpha 2$ equal to 0° with respect to the circumferential direction in this example, is arranged radially between the radially inner face of the wire 7 and the carcass reinforcement 10 and has a width $\lambda'$ such that it can isolate the carcass reinforcement 10 from the wire 7, the width $\lambda'$ being the axial distance, measured parallel to the axis of rotation, between the ends of the ply.

The tire thus described is generally used without inner tube and therefore has an inner layer of rubber 15 with base of vulcanized rubber which is impervious to the inflation gases which may be used for the inflation of the tire.

Figure 3:
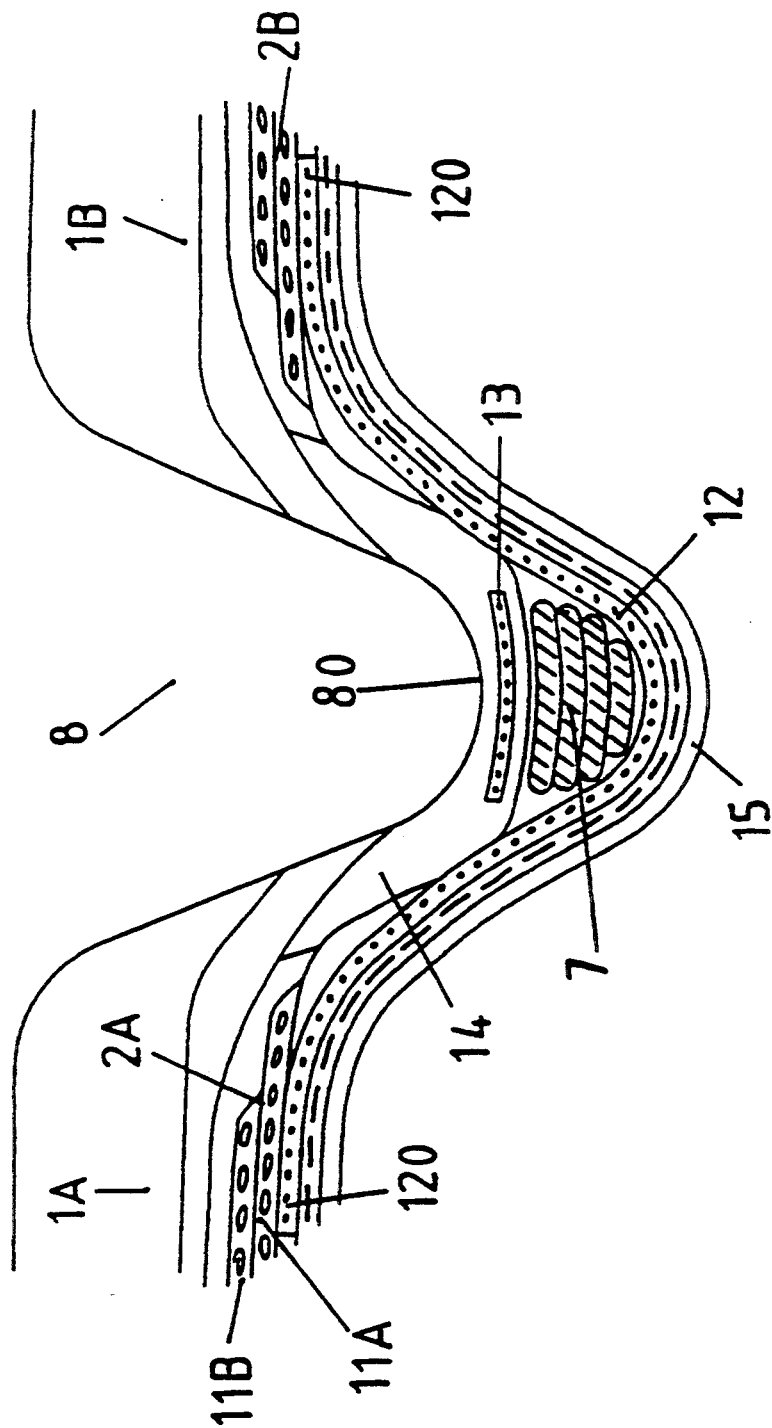
FIG. 3 shows a variant of FIG. 2, relating to the architecture of the reinforcement plies of the rubber layers below and over the reinforcement wire.

FIG. 3 differs from FIG. 2 only by the increase in the axial width of the reinforcement ply 12 located between the reinforcement wire 7 and the carcass reinforcement 10. This increase is such that the ends 120 of the ply 12 on both sides of the groove 8 are arranged radially below the crown reinforcements 2A, 2B respectively.

Figure 4:
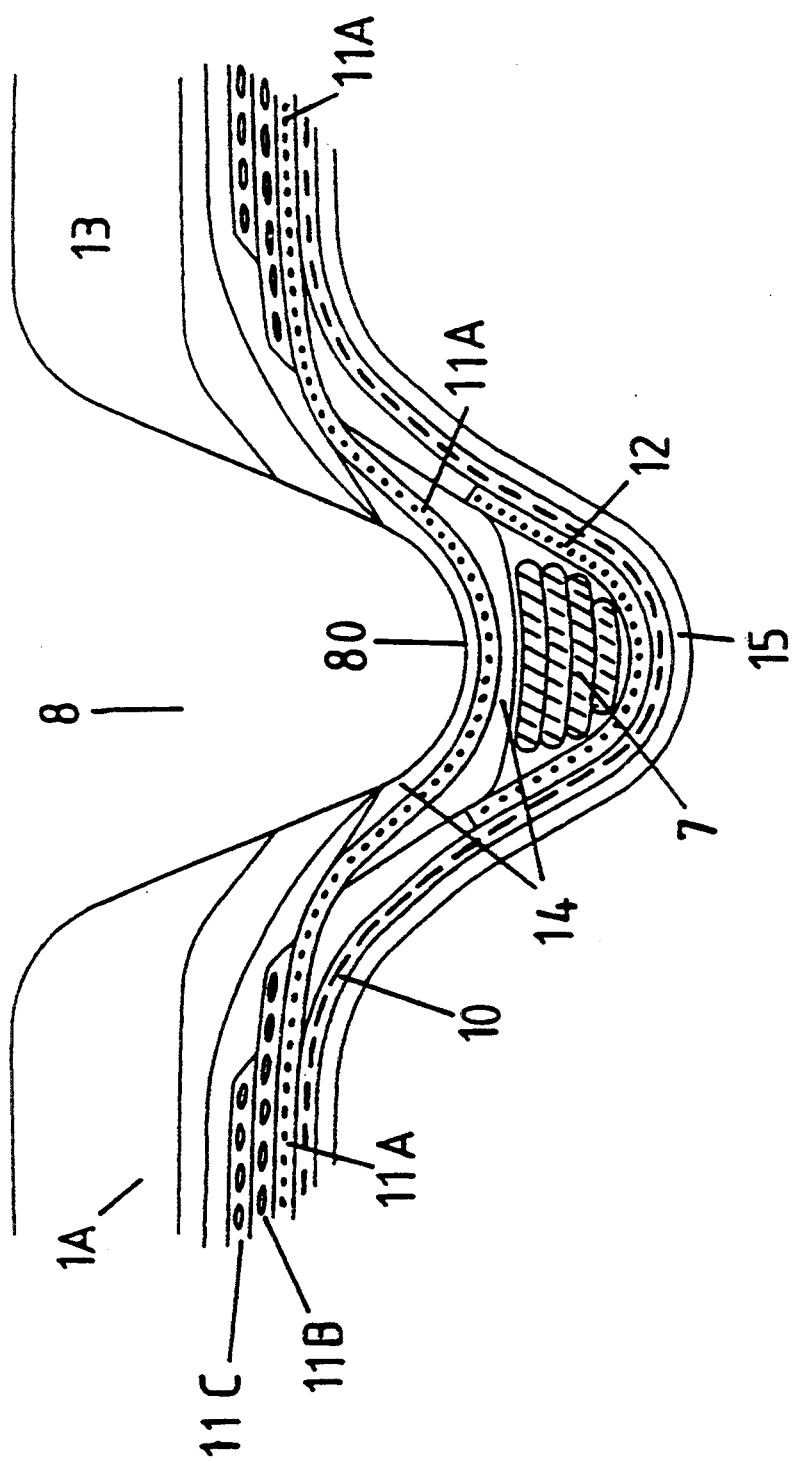
FIG. 4 shows another variant, relating to a tire comprising a crown reinforcement one of the plies of which is axially continuous.

FIG. 4 shows another variant in which the crown reinforcement reinforcing the tire P is formed of a radially inner ply 11A which is continuous over the entire axial width of the tire, this ply being formed of textile cables forming an angle of 0° with the circumferential direction of the tire and being arranged radially on both sides of the groove 8 below one or more additional crown plies 11B and 11C respectively of metal cables.

The continuously radially inner play 11A replaces the ply of cables 13 of FIG. 2, while the remaining architecture is unchanged.

We claim:

1. A tire comprising at least two treads (1A and 1B), a pair of beads (4A, 4B) and at least one anchoring bead wire (5A, 5B) in each bead, the two treads being spaced axially from each other by a connecting region (6) comprising a groove (8) and, at its center, a reinforcement wire (7) of radius $R_T$ less than that of the treads (1A and 1B) and radially to the inside of which there passes a radial carcass reinforcement (10) anchored in each bead to at least one anchoring bead wire, said carcass reinforcement being located radially beneath at least one crown reinforcement formed of at least two plies of cords or cables inclined by an angle of between 10° and 50° with respect to the circumferential direction and reinforcing the treads, each tread being of width L, characterized by the fact that:

the groove (8) in the connecting region (6) between the two treads has a width 1, measured at the level of the tread surfaces, of between 0.10 and 0.25 times the total width 2L of the treads, a depth h at least equal to $0.6(R_S-R_E)$ and two walls (81A, 81B) inclined with respect to a perpendicular N to the travel surface by an angle α of between 15° and 25°, these two walls being connected radially on the inner side by a cylindrical portion defining the groove bottom (80) tangent to said walls, and that the radius $R_T$ of the center of gravity of the transverse section of the reinforcement wire is at least equal to $R_E+0.1(R_S-R_E)$, $R_S$ being the radius of the points (S) of the carcass reinforcement furthest from the axis of rotation of the tire, and $R_E$ being the radius of the points (E) of the carcass reinforcement furthest axially from the equatorial plane (XX') of the tire;

and a layer of vulcanized rubber (14) forming the groove bottom (80) and located radially above the reinforcement wire (7) is reinforced by at least one ply of cables (13), said ply being located radially substantially at the middle of the layer of rubber (14).

2. A tire according to claim 1, characterized by the fact that the reinforcement ply of the rubber layer (14) is a continuous one of the plies (11A, 11B, 11C) of the crown reinforcement (2), the other plies of said crown reinforcement being axially discontinuous and forming blocks (2A, 2B) separately reinforcing the treads (1A, 1B).

3. A tire according to claim 1, characterized by the fact that it comprises two separate crown reinforcements (2A, 2B) on the two sides of the central groove (8), the reinforcement ply (13) of the rubber layer (14) being independent of the crown reinforcements (2A and 2B) and having an axial width (λ) substantially equal to the axial width of the bottom of the groove.

4. A tire according to claim 1, characterized by the fact that it comprises two separate crown reinforcements (2A, 2B) on opposite sides of the central groove (8), the reinforcement ply (13) of the rubber layer (14) being independent of the crown reinforcements (2A, 2B) and having an axial width such that its axial edges are juxtaposed radially with the axially inner edges of the crown reinforcements, respectively.

5. A tire according to claim 1, characterized by the fact that at least one ply of cords or cables (12) is arranged radially between the reinforcement wire (7) and the carcass reinforcement (10).

6. A tire according to claim 5, characterized by the fact that the ply which is arranged radially on the inside of the reinforcement wire (7) is a continuous one of the plies (11A, 11B, 11C) of the crown reinforcement (2), the other plies of said reinforcement being axially discontinuous and forming blocks (2A, 2B) which separately reinforce the treads (1A, 1B).

7. A tire according to claim 5, characterized by the fact that it comprises two distinct crown reinforcements (2A, 2B) on opposite sides of the groove (8) in the connecting region (6), the reinforcement ply (12) arranged radially to the inside of the reinforcement wire (7) being independent of the crown reinforcements (2A and 2B) and its ends being axially spaced by an amount (λ') substantially equivalent to the axial width (1') of the groove bottom (80).

8. A tire according to claim 5, characterized by the fact that it comprises two separate crown reinforcements (2A, 2B) located on opposite sides of the groove (8) in the connecting region (6), the reinforcement ply (12) arranged radially to the inside of the reinforcement wire (7) being independent of the crown reinforcements and having an axial width such that its axial edges are juxtaposed radially with the respective axially inner edges of said reinforcements.

* * * * *